United States Patent
Chiavarotti

(10) Patent No.: US 6,678,148 B2
(45) Date of Patent: Jan. 13, 2004

(54) METHOD FOR PRODUCING ELECTRODES AS WELL AS ELECTRODES PRODUCED BY THE METHOD

(75) Inventor: Giovanni Pietro Chiavarotti, Milan (IT)

(73) Assignee: Becromal S.p.A., Rozzano MI (IT)

( * ) Notice: Subject to any disclaimer, the term of this patent is extended or adjusted under 35 U.S.C. 154(b) by 140 days.

(21) Appl. No.: 09/893,560

(22) Filed: Jun. 29, 2001

(65) Prior Publication Data

US 2002/0047537 A1 Apr. 25, 2002

(30) Foreign Application Priority Data

Jun. 30, 2000 (DE) .......................................... 100 31 906

(51) Int. Cl.$^7$ ............................................... H01G 9/145
(52) U.S. Cl. ........................ 361/508; 361/503; 361/509; 361/516; 361/523; 361/528; 29/25.41; 29/25.42
(58) Field of Search .................................. 361/508, 509, 361/510, 512, 523, 516, 528, 433, 302, 330, 502, 503, 504; 29/25.42, 25.41, 825, 854

(56) References Cited

U.S. PATENT DOCUMENTS

| | | | | |
|---|---|---|---|---|
| 4,220,945 A | * | 9/1980 | Kakahashi et al. | |
| 5,310,373 A | * | 5/1994 | Treiber et al. | |
| 5,555,155 A | * | 9/1996 | Patel et al. | |
| 5,716,733 A | * | 2/1998 | Tomazic | |
| 5,802,688 A | * | 9/1998 | Tanaka | |
| 5,841,689 A | * | 11/1998 | Gendlin | |
| 6,208,502 B1 | * | 3/2001 | Hudis et al. | |

FOREIGN PATENT DOCUMENTS

EP 0 986 078 A2 3/2000

* cited by examiner

Primary Examiner—Dean A. Reichard
Assistant Examiner—Nguyen T. Ha
(74) Attorney, Agent, or Firm—Wenderoth, Lind & Ponack, L.L.P.

(57) ABSTRACT

An electrode for an electrolytic capacitor and a method for producing the electrodes including a conducting electrode material, in particular a foil, such as an aluminum foil. The conducting electrode material, for the purpose of increasing the surface, is exposed to a chemical or an electrochemical etching process. During the etching process, in an etching cell, at least one zone of the surface of the electrode material is covered with an etch-resistant coating and/or a separate protective shielding. After the etching process, the electrode is cut out, punched out or the like worked out of the electrode material such that the etched zone forms at least one margin region, in particular, a margin strip of the electrode.

17 Claims, 1 Drawing Sheet

METHOD FOR PRODUCING ELECTRODES AS WELL AS ELECTRODES PRODUCED BY THE METHOD

BACKGROUND OF THE INVENTION

1. Field of the Invention

The invention relates to a method for producing electrodes for electrolytic capacitors comprising a conducting electrode material. The material may be a foil such as an aluminum foil, which, for the purpose of increasing the surface area, is exposed to a chemical or electrochemical etching process. The invention also relates to electrodes produced with such a method.

2. Description of the Related Art

In the field of electrolytic capacitors it is known to use, for example, aluminum foils as electrode material, in which the aluminum foils have been subjected to an etching process in order to increase the effective surface thereof. In an electrochemical etching process, the aluminum foil is arranged, for example, between two conducting plates of an etching cell, and the plates are immersed in a conducting solution of electrolytes. The etching process can subsequently take place in different polarization configurations. For example, the aluminum foil can be connected to the positive pole of a current source and the conducting plates of the etching cell are connected to the negative pole of the current source, and a continuous or pulsed current flows. A further feasible configuration comprises disposing the aluminum foil between two conducting plates, between which an AC current flows. It is, in addition, known in the case of anodic foils to carry out an anodic oxidation after the etching process, which makes possible the growth of aluminum oxide on the foil surface. However, for specific electrolytic capacitors, electrodes with an etched surface are also frequently required in which, for example, in the margin region, connecting contacts must be applied. The electrode is to have good electric and thermal contact at these margin regions such that the equivalent series resistance (ESR) and the power consumption are improved when the electrodes are rolled up, for example, for the production of the electrolytic capacitor. Etching impairs such good contacts.

SUMMARY OF THE INVENTION

It is the object of the invention to provide in a simple manner electrodes which offer, in particular in their margin region, good electric and thermal contact.

This object is essentially solved by a method of the above described type in which, during the etching process, at least one zone of the surface of the electrode material is covered in the etching cell with an etch-resistant coating and/or by a separate protective shielding. After the etching process, the electrode is cut out, punched out, or otherwise worked out of the electrode material such that the non-etched zone forms at least a margin region, in particular a margin strip, of the electrode.

With this method, non-etched zones can be simply formed in any shape on the surface of the electrode material such that during the subsequent formation of the electrodes their margins are non-etched. Thus, the production method can be adapted to special requirements for specific electrodes. It is, in particular, possible to use sheet electrode material in the form of webs from which individual electrodes are subsequently punched out, such as in the form of strip electrodes which can be wound up. In this way, the production process can be standardized and made efficient for different electrode types, so that considerable cost reductions can be attained. In addition, the handling of large, for example web-form, foil material during the etching process is simpler than the handling of individual narrow electrodes. The provision of contact zones, which offer very good electric and thermal contact, can be omitted due to special surface working. The method according to the present invention is suitable for the production of electrodes used as anodes and cathodes.

In a simple implementation of the method according to the present invention for the production of these electrodes, a coating or foil can serve as a shielding deposition. The coating is applied onto the surface by, for example, application, emplacement, adhesion or the like, and after the etching, the coating is Such a method can be employed especially favorably, in particular, in the production of standardized electrode types.

It is also conceivable that a lacquer or a synthetic resin serves as the coating, wherein the lacquer or the synthetic resin is applied by spraying or by means of being brushed onto the surface. After the etching process, the lacquer or synthetic resin can be dissolved by an organic solution, for example. With such a method, a deposition, which has a complicated geometric shape, can also be readily applied onto the surface. In particular, when using a mask, the zones on the electrode material can be developed precisely.

In an electrochemical etching, the deposition is preferably developed as an insulating material, and during the etching process the deposition forms an electric shielding on the conducting electrode material. The insulating material can comprise, for example, an electrically nonconducting synthetic material, and is arranged between the electrode material and the conducting plates of an etching cell. In this case, the etching electrolyte is not in contact with the shielded zone since the insulating material is in direct contact with the surface of the electrode material such that no etching takes place in the shielded zones.

According to another implementation of the method, the protective shielding comprises a nonconducting material as a separate element arranged in the etching cell between the electrode material and the conducting plates of the etching cell such that the nonconducting material is in direct contact with the electrode material, and during the electrochemical etching process, the nonconducting material forms electric shielding.

The position of the protective shieldings in the etching cell can be handled especially simply, and allows for the desired non-etched surface of the electrode material to be readily reached during the continuous operation of the etching process. To this end, the protective shielding is already disposed in the desired geometry in the etching cell and does not need to be developed as a deposition in each instance on the electrode materials. However, a combination of both implementations of the method is also conceivable in which the protective shieldings, can, for example, also serve to fix the electrode material in the etching cell.

In the production of strip electrodes, the zones are preferably formed as parallel strips or the like, spaced apart from each other, defining regions extending in the longitudinal direction of the electrode material and developed, for example, as band material.

If the electrode is to be used as an anode, the electrode material is exposed to anodic oxidation after the etching. The deposition can be previously detached from the areas not to be etched, such that the etched and the non-etched zones are oxidized. For use of the electrode as a cathode, such treatment is not necessary.

The etching is preferably carried out with the formation of non-etched zones and, if appropriate, the oxidation is carried out on both sides of the electrode material. The non-etched zones can be developed on both sides of the electrode material corresponding to one another such that the electrodes formed therefrom have the same structure on both sides. In the case of special capacitor types, however, an asymmetric implementation of non-etched zones on the two sides of the material is also conceivable.

For the production of electrode strips from the, for example, web-like electrode material, corresponding electrode strips are cut out. Preferably, at least one longitudinal margin of the strip material is not etched.

Efficient processing of the electrode material is possible if for example, several strip-like electrodes are cut out of the sheet electrode materials.

The present invention further relates to electrodes comprised of a conducting electrode material such as a foil formed as a band material, for example an aluminum foil, with a surface which is etched on one or both sides and, if appropriate, anodically oxidized. In at least one margin region, preferably margin strips of the surface, at least one non-etched zone is developed. Zones can therein be disposed on each side of the electrode material corresponding to one another.

In the development of strip electrodes, corresponding strips are cut out of the, for example, web-form electrode material to have the width of the capacitor to be produced therefrom such that, preferably, at least one margin of the strip electrode is not etched.

Further characteristics, advantages and application feasibilities of the present invention will be evident based on the following description of exemplary embodiments and the accompanying drawing figures. All described and/or graphically shown characteristics by themselves or in any combination form therein the subject matter of the present invention, independently of their compilation in the claims or their reference back.

DETAILED DESCRIPTION OF THE INVENTION

Figure 1:
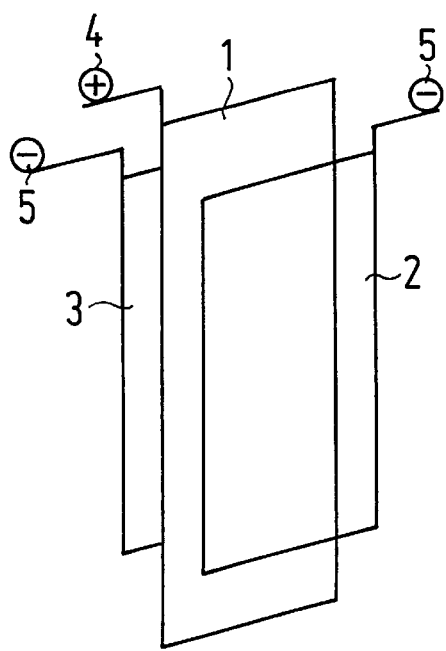
FIG. 1 is a schematic illustration of a configuration for etching an electrode according to a first known method.
Figure 2:
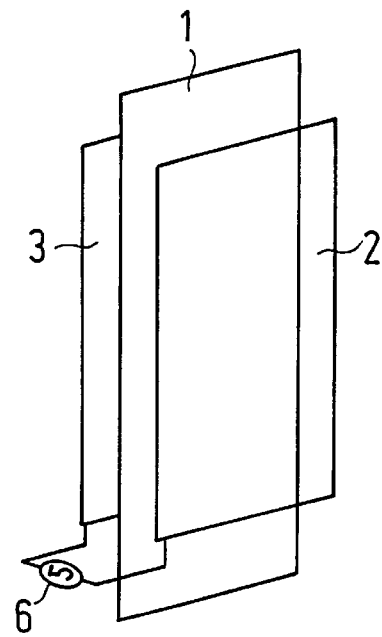
FIG. 2 is a schematic illustration of a configuration for etching the electrode according to a second known method.

FIGS. 1 and 2 show schematically the disposition of a conducting electrode material 1 between two conducting plates 2, 3 during the etching process, in which the overall configuration is immersed in a (not shown) solution of electrolytes of an etching cell. In the variant depicted in FIG. 1 of the electrochemical etching, the electrode material 1 (for example, an aluminum foil) is connected to the positive pole of a voltage source. The two conducting plates 2, 3, in contrast, are connected to the negative pole 5 of the voltage source. The etching subsequently takes place by switching on a DC current or a pulsed current.

FIG. 2 shows a similar configuration of electrode material 1 and conducting plates 2, 3 which are immersed in a (not shown) solution of electrolytes for the etching process. In this case, the plates 2, 3 are connected to an AC voltage source 6. The electrode material 1 is not connected to a voltage source.

Purely chemical etching methods are likewise conceivable, in which the electrode material for the chemical etching is simply immersed in corresponding etching solutions. In this case, the conducting plates 2, 3 can be omitted.

Figure 3:
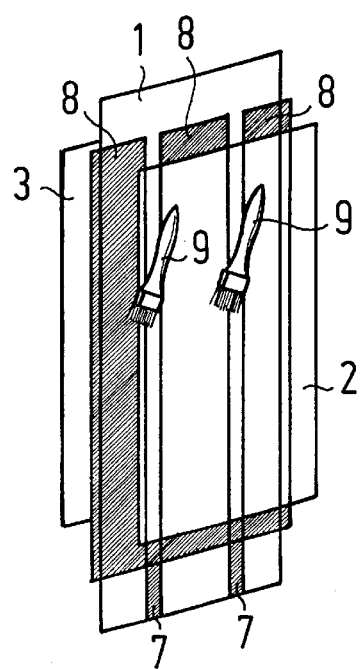
FIG. 3 is a schematic illustration of a configuration for carrying out the method according to the present invention with a deposition applied onto an electrode material.

In order to avoid etching the entire surface of the electrode material 1, but rather to develop non-etched surface zones (such as strip-form zones) on the electrode material 1, an electrically insulating deposition 7 is applied on the electrode material 1, for example a non-etched aluminum foil (See FIG. 3). The deposition 7 prevents electrochemical corrosion during the subsequent etching process in areas in which the deposition 7 applied on the surface is arranged between the electrode material 1 and the conducting plates 2, 3 in an etching cell. During the electrochemical etching process, current flows from the electrode material 1 to the plates 2, 3 except in the areas (zones) shielded by the deposition 7. Shielding acid-resistant depositions, which prevent chemical corrosion, can also be used.

To apply the deposition 7, first the regions of the electrode material 1 to be etched are covered with masks 8. Subsequently, a preferably liquid deposition material, such as electrically insulating lacquers or acid-resistant synthetic resins, is applied on the regions of the electrode material 1 not covered by the masks 8. This can take place by application with a brush 9 (as shown in FIG. 3), or by spraying or the like. After applying the deposition 7, the masks 8 are removed before the electrode material 1 is subjected to the etching process to form etched surface regions. However, the deposition 7 can also be comprised, for example, of an electrically insulating foil which is held on the surface of the electrode material 1 due to, for example inherent adhesion or by being adhered thereon.

After the etching process, the lacquers or synthetic resins serving as deposition 7, which protect the electrode material 1 against electrochemical corrosion during the etching, are removed in an organic solution. In order to obtain strip-form zones, the deposition 7 is comprised of narrow strips, which are applied in the longitudinal direction of the band-form electrode material 1 on its surface spaced apart at a predetermined distance from each other. The spacing of the deposition strips corresponds to the width of the electrode strip required for the production of a wound capacitor. However, other geometric forms of the deposition 7 are also conceivable. This can also be arranged at any other desired site on the electrode material 1.

Figure 4:
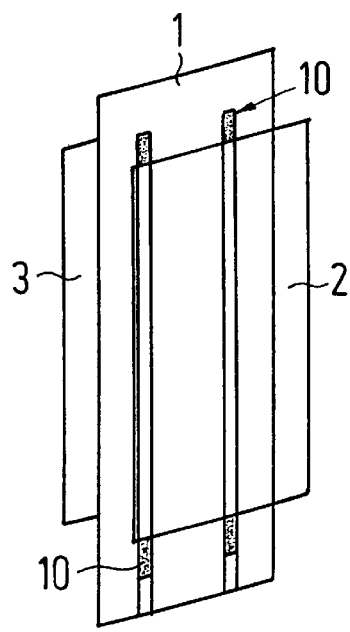
FIG. 4 is a schematic illustration of an alternative configuration for carrying out the method according to the present invention with a protective shielding disposed separately in an etching cell between the electrode material and conducting plates.

FIG. 4 shows a further option for the production of non-etched surface zones on the electrode material 1 according to the present invention. In this option, separate strip-form protective shieldings 10 of a non-conducting material are disposed in the etching cell in front of the conducting plate 2 and/or, if appropriate, the conducting plate 3. During the etching process, the electrode material 1 is placed against the protective shieldings 10, such that the electrode material 1 and the protective shieldings 10 are in direct contact. The protective shieldings 10 thus form an electric shielding to cover the strip-form zones and prevent the flow of current. Therefore, etching only takes place in the regions without protective shieldings 10.

The protective shieldings 10 can be fixedly positioned in the etching cell or can be formed integrally with it.

The alternative methods represented in FIGS. 3 and 4 for developing non-etched zones on the electrode material 1, as a rule, are applied equally on both sides of the electrode material 1 such that non-etched zones corresponding to one another are generated on each surface.

After the etching process, the electrode material 1 can be subjected to anodic oxidation in which the etched as well as ad the non-etched zones are oxidized in order to develop an oxide layer on the surface of the electrode material 1. In the event that an aluminum foil is used as the electrode material 1, an aluminum oxide layer is formed.

The treated electrode material 1 is subsequently brought into the desired electrode form. In the depicted embodiments with strip-like depositions 7, or protective shieldings 10, strip electrodes are cut from the electrode material 1 in the longitudinal and transverse direction such that at least one of their margins is not etched (forming) a non-etched surface margin region). From sheet electrode material 1, several strip-form electrodes can be cut. The non-etched zones provide especially good electric and thermal contact, particularly along the margins of the electrode strips. In this way, the equivalent series resistance (ESR) and the power consumption of the electrodes is improved, if the electrodes developed as foils are, for example, rolled up to form electrolytic capacitors. In the case of electrodes of a band material, efficient fabrication is thus possible.

List of Reference Symbols

1 Electrode material
2, 3 Conducting plates
4 Positive pole
5 Negative pole
6 AC current source
7 Deposition
8 Mask
9 Brush
10 Protective shielding

I claim:

1. An electrode comprising:
    a conducting electrode material having a first side and a second side, each of said first side and said second side having at least one non-etched region, at least one of said first side and said second side having an etched surface region and having at least one non-etched surface margin region forming at least one of said at least one non-etched region.

2. The electrode of claim 1, wherein each of said at least one non-etched region on said first side of said electrode material has a corresponding non-etched region on said second side of said electrode material.

3. The electrode of claim 2, wherein said electrode material has an equal number of said at least one non-etched region on said first side and said second side.

4. The electrode of claim 1, wherein each of said first side and said second side has an etched surface region and an anodically oxidized surface layer.

5. The electrode of claim 1, wherein said at least one non-etched surface margin region comprises at least one non-etched surface margin strip.

6. The electrode of claim 1, wherein said electrode material comprises a foil material formed as a band material.

7. The electrode of claim 6, wherein said foil material comprises aluminum foil.

8. An electrode comprising:
    a conducting electrode material having a first side, having a second side, and having at least one non-etched margin, at least one of said first side and said second side having an etched surface region and having at least one non-etched surface margin region.

9. The electrode of claim 8, wherein each of said first side and said second side has an etched surface region and an anodically oxidized surface layer.

10. The electrode of claim 8, wherein said at least one non-etched surface margin region comprises at least one non-etched surface margin strip.

11. The electrode of claim 8, wherein said electrode material comprises a foil material formed as a band material.

12. The electrode of claim 11, wherein said foil material comprises aluminum foil.

13. An electrode comprising:
    a conducting electrode material having a first side and a second side, at least one of said first side and said second side having an etched surface region and having at least one non-etched surface margin region formed by:
    covering a portion of a surface of said electrode material with at least one of an etch-resistant deposition and a separate protective shielding in an etching cell,
    exposing said electrode material to one of a chemical and an electrochemical etching process to increase a surface area of said electrode material and thereby form said etched surface region, and
    forming said electrode from said electrode material after the exposing process such that said at least one non-etched surface margin region is formed from said covered portion of said surface of said electrode material.

14. The electrode of claim 13, wherein each of said first side and said second side has an etched surface region and an anodically oxidized surface layer.

15. The electrode of claim 13, wherein said at least one non-etched surface margin region comprises at least one non-etched surface margin strip.

16. The electrode of claim 13, wherein said electrode material comprises a foil material formed as a band material.

17. The electrode of claim 16, wherein said foil material comprises aluminum foil.

* * * * *